United States Patent
Jamison et al.

(10) Patent No.: US 9,463,869 B2
(45) Date of Patent: Oct. 11, 2016

(54) SLIDABLE DIVERGENT TRAILING EDGE DEVICE

(71) Applicant: The Boeing Company, Chicago, IL (US)

(72) Inventors: Flint M. Jamison, Lynnwood, WA (US); Stephen R. Amorosi, Seattle, WA (US); Michael K. Klein, Bothell, WA (US)

(73) Assignee: The Boeing Company, Chicago, IL (US)

( * ) Notice: Subject to any disclaimer, the term of this patent is extended or adjusted under 35 U.S.C. 154(b) by 26 days.

(21) Appl. No.: 14/298,105

(22) Filed: Jun. 6, 2014

(65) Prior Publication Data
US 2015/0353188 A1  Dec. 10, 2015

(51) Int. Cl.
| B64C 3/50 | (2006.01) |
| B64C 13/24 | (2006.01) |
| B64C 3/38 | (2006.01) |
| B64C 3/28 | (2006.01) |
| B64C 3/14 | (2006.01) |

(52) U.S. Cl.
CPC ............... *B64C 13/24* (2013.01); *B64C 3/38* (2013.01); *B64C 3/50* (2013.01); *B64C 3/28* (2013.01); *B64C 2003/147* (2013.01); *Y02T 50/12* (2013.01); *Y02T 50/145* (2013.01)

(58) Field of Classification Search
CPC ............ B64C 9/16; B64C 9/18; B64C 9/02; B64C 3/50; B64C 2009/143; B64C 13/24; B64C 3/28; B64C 2003/147; Y02T 50/32; Y02T 50/44; Y02T 50/12

USPC ............... 244/215, 216, 217, 45 R
See application file for complete search history.

(56) References Cited

U.S. PATENT DOCUMENTS

| 2,147,360 | A |   | 2/1939  | Zaparka |             |
| 2,271,226 | A | * | 1/1942  | Johnson | B64C 9/18   |
|           |   |   |         |         | 244/213     |
| 2,306,015 | A | * | 12/1942 | Dornier | B64C 9/18   |
|           |   |   |         |         | 244/216     |
| 240,495   | A |   | 7/1946  | Gouge   |             |
| 2,405,726 | A | * | 8/1946  | Zap     | B64C 9/16   |
|           |   |   |         |         | 244/213     |

(Continued)

FOREIGN PATENT DOCUMENTS

EP        1488998       12/2004

OTHER PUBLICATIONS

Cohen, J., "Full Scale Trials on Scion M.3 with a Gouge Flap," R&M No. 1753, A.R.C.Technical report, 1936.

(Continued)

*Primary Examiner* — Brian M O'Hara
*Assistant Examiner* — Assres H Woldemaryam
(74) *Attorney, Agent, or Firm* — Hanley, Flight & Zimmerman, LLC

(57) ABSTRACT

A wing includes a trailing edge, and a divergent trailing edge device slideable along an aft surface of the trailing edge between a stowed position and a fully deployed position. The trailing edge device is located entirely within the trailing edge when stowed, and it increases lift over drag of the wing when deployed.

23 Claims, 7 Drawing Sheets

(56) References Cited

U.S. PATENT DOCUMENTS

| | | | |
|---|---|---|---|
| 2,791,385 | A | 5/1957 | Johnson |
| 3,076,623 | A | 2/1963 | Lyon |
| 3,617,018 | A * | 11/1971 | Baetke ............... B64C 9/22 244/214 |
| 4,460,138 | A * | 7/1984 | Sankrithi ............ B64C 9/18 244/215 |
| 4,614,320 | A * | 9/1986 | Rutan ............... B64C 9/18 244/216 |
| 4,858,852 | A | 8/1989 | Henne et al. |
| 6,565,045 | B1 | 5/2003 | Correge et al. |
| 6,641,089 | B2 | 11/2003 | Schwetzler et al. |
| 8,070,106 | B2 * | 12/2011 | Engelbrecht ........ B64C 9/16 244/213 |
| 8,162,607 | B2 * | 4/2012 | Grohmann .......... B64C 27/615 416/23 |
| 8,438,743 | B2 * | 5/2013 | Wallen ............ B64D 45/0005 244/213 |
| 8,695,926 | B2 * | 4/2014 | Brewer ............... B64C 3/50 244/215 |
| 2005/0001103 | A1 | 1/2005 | Vassberg et al. |
| 2007/0262207 | A1 * | 11/2007 | Morgenstern ........ B64C 3/16 244/214 |
| 2009/0212158 | A1 * | 8/2009 | Mabe ................. B64C 9/32 244/1 N |
| 2009/0230240 | A1 * | 9/2009 | Osborne ............. B64C 9/32 244/87 |
| 2010/0303630 | A1 * | 12/2010 | Gandhi ............. B64C 27/001 416/223 R |
| 2011/0127387 | A1 * | 6/2011 | Morris ............... B64C 9/26 244/216 |
| 2012/0261519 | A1 | 10/2012 | Brewer et al. |
| 2012/0280089 | A1 * | 11/2012 | Keller ............... B64C 9/20 244/215 |

OTHER PUBLICATIONS

Thompson et al., "Divergent-Trailing-Edge Airflow Foil," Journal of Aircraft, vol. 33, No. 5, Sep.-Oct. 1996, pp. 950-955.
Extended European Search Report, issued by the European Patent Office in connection with European Patent Application No. 15165345.8, on Nov. 4, 2015, 10 pages.

* cited by examiner

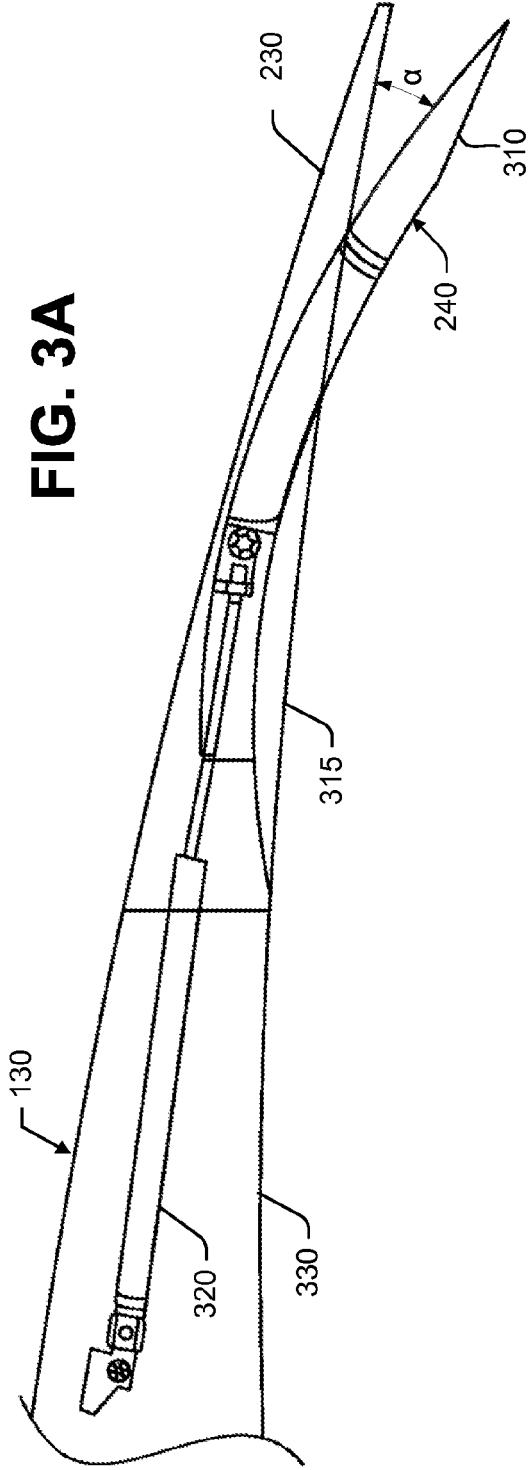
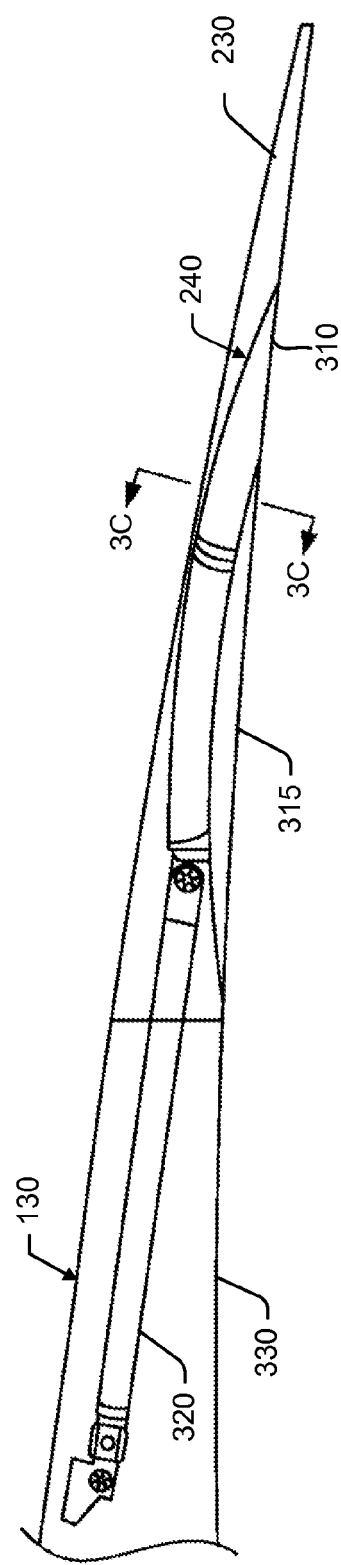

FIG. 9

SELECTIVELY SLIDE ONE OR MORE DIVERGENT TAILING EDGE DEVICES ALONG A TRAILING EDGE OF EACH AIRCRAFT WING TO REDUCE LIFT OVER DRAG (L/D) OF EACH WING — 910

STOW ANY DIVERGENT TRAILING EDGE DEVICES THAT ARE NOT DEPLOYED — 920

SLIDABLE DIVERGENT TRAILING EDGE DEVICE

BACKGROUND

A Divergent Trailing Edge (DTE) device can increase lift over drag (L/D) of a wing. The DTE may be fixed to an aft lower surface of a wing. However, a fixed DTE creates a load distribution that can have a significant collateral impact of requiring a stronger, heavier wing.

A DTE may instead be hinged to an aft lower surface of a wing. A hinged DTE may be retracted to a stowed position, and it may be scheduled to extend during the less heavily loaded phases of flight, thus minimizing the collateral structural weight.

A hinged DTE may be extended and retracted by an actuator and drive linkage. The actuator and linkage carry air loads and, therefore, are sized accordingly. If the actuator fails during flight, free surface flutter of the hinged DTE can occur. If the actuator and linkage are too large to fit within the airfoil, they are covered by an external fairing, which adds complexity, weight, and drag.

SUMMARY

According to an embodiment herein, a wing comprises a trailing edge, and a divergent trailing edge device slideable along an aft surface of the trailing edge between a stowed position and a fully deployed position. The trailing edge device is located entirely within the trailing edge when stowed, and it increases lift over drag of the wing when deployed.

According to another embodiment herein, an aircraft comprises a wing including a trailing edge having a moveable flight control surface and a fixed surface. The aircraft further comprises a plurality of divergent trailing edge devices integrated with the moveable flight control surface, and a plurality of actuators for independent control of the divergent trailing edge devices. Each divergent trailing edge device is slideable between a stowed position entirely within the moveable flight control surface and a deployed position at least partially under the moveable flight control surface.

According to another embodiment herein, a method performed during flight of an aircraft comprises sliding a divergent trailing edge device along a trailing edge of each aircraft wing to reduce lift over drag (L/D) of the wing; and thereafter stowing the divergent trailing edge device entirely within the trailing edge.

These features and functions may be achieved independently in various embodiments or may be combined in other embodiments. Further details of the embodiments can be seen with reference to the following description and drawings.

BRIEF DESCRIPTION OF THE DRAWINGS

FIG. 3A is an illustration of a divergent trailing edge device in a fully deployed position.
FIG. 3B is an illustration of a divergent trailing edge device in a stowed position.
FIG. 9 is an illustration of a method of enhancing performance of an aircraft.

DETAILED DESCRIPTION

Figure 1:
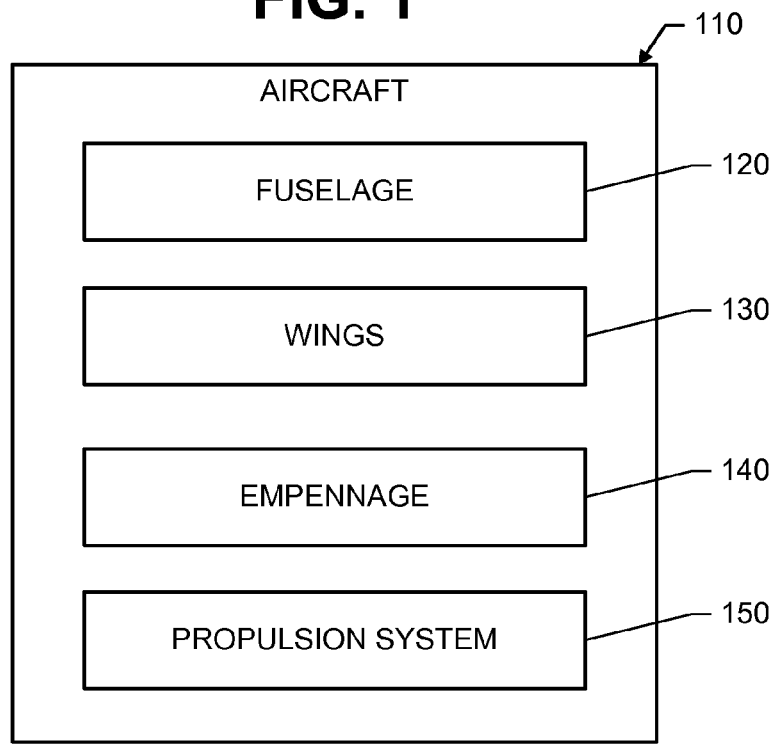
FIG. 1 is an illustration of an aircraft.

Reference is made to FIG. 1, which illustrates an aircraft 110 including a fuselage 120, wings 130, and empennage 140. One or more propulsion units 150 are coupled to the fuselage 120, wings 130 or other portions of the aircraft 110.

Figure 2:
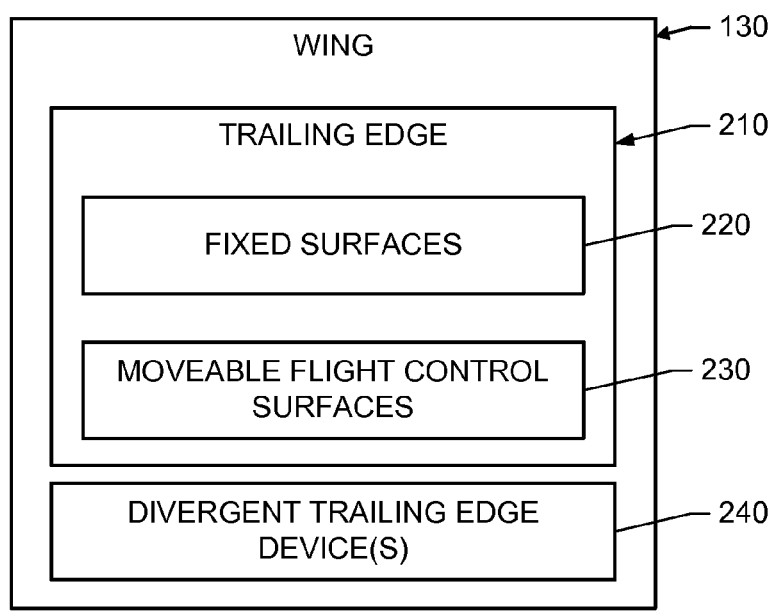
FIG. 2 is an illustration of a wing.

Reference is made to FIG. 2. Each wing 130 includes a leading edge and a trailing edge 210. The trailing edge 210 may include fixed surfaces 220 and moveable flight control surfaces 230. Examples of the moveable flight control surfaces 230 include, but are not limited to, ailerons, flaps, flaperons, and slats.

The wing 130 further includes at least one divergent trailing edge (DTE) device 240. Each DTE device 240 is slideable along an aft surface of the trailing edge 210 between a stowed position and a fully deployed position. When stowed, the DTE device 240 is entirely within the trailing edge 210. When deployed fully or partially, the DTE device 240 extends beneath a lower surface of the trailing edge 210 to increases lift over draft of the wing 130.

Chord length of the DTE device 240 may be between about 1% and 6% of chord length of the wing 130. In some configurations, the DTE device 240 may have a chord length between about four and six inches.

Each DTE device 240 may be mounted to either a fixed surface 220 of the trailing edge 210 or a moveable flight control surface 230 of the trailing edge 210. In some wing configurations, multiple DTE devices 240 may be mounted to a fixed surface 220 and/or a moveable flight control surface 230.

Figure 7:
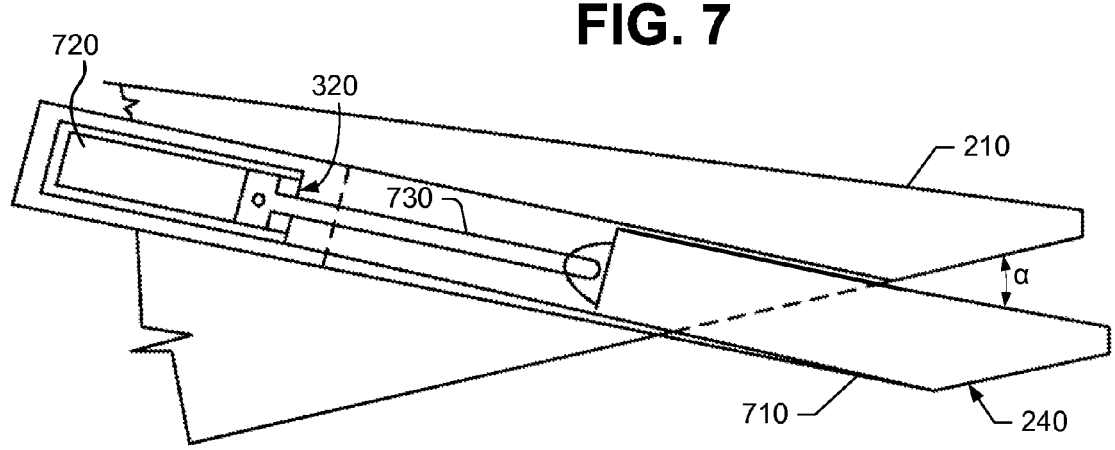
FIG. 7 is an illustration of a divergent trailing edge device including a substantially straight stiffened panel.

Reference is now made to FIGS. 3A and 3B, which illustrate an example of a wing 130 including a moveable flight control surface 230 and a DTE device 240 mounted to the moveable flight control surface 230. The DTE device 240 includes a stiffened panel 310. In some configurations, such as the configuration illustrated in FIGS. 3A and 3B, the stiffened panel 310 is curved. In other configurations, the stiffened panel may be straight (see, e.g., FIG. 7).

The moveable flight control surface 230 also includes a cover 315 for the DTE device 240. The cover 315 may also provide a sliding surface for the DTE device 240.

An actuator assembly 320 may be utilized to slide the trailing edge device 240 between the stowed and deployed positions. The actuator assembly 320 may control the DTE device 240 independently of the moveable flight control surface 230. In some configurations, the actuator assembly 320 may include an actuator and linkage. In other configurations, the actuator assembly 320 may include an actuator alone. The actuator may be pneumatic, hydraulic, or electromechanical, and it may be located in a wing box 330 of the wing 130.

FIG. 3A shows the DTE device 240 in a fully deployed position. By way of example, FIG. 3A shows the DTE device 240 with a maximum divergence angle (α) of about 15 degrees.

The stiffened panel 310 may have a curvature whereby the divergence angle (α) of the DTE device 240 varies as the DTE device 240 is being deployed. For instance, the DTE device 240 has a maximum divergence angle (α) when fully deployed, and a smaller divergence angle (α) when partially deployed.

FIG. 3B shows the DTE device 240 in the stowed position. The DTE device 240 is located entirely inside the moveable flight control surface 230 and, therefore, does not affect L/D of the wing 130.

The DTE device 240 may be stowed to avoid exposure to high loading. As a result, a wing 130 including the DTE device 240 may have lighter wing structures than a wing including a fixed divergent trailing edge device. The lighter structures, in turn, lead to weight and fuel savings. Yet the DTE device 240 offers the same L/D advantage as a fixed divergent trailing edge device.

Because the DTE device 240 is slideable instead of hinged, air loads are mostly carried through the wing 130. As a result, the DTE device 240 avoids issues inherent in hinged devices, such as issues with stiffness and torsional loads. The DTE device 240 also avoids free surface and flutter problems in the event the actuator assembly 320 fails.

Moreover, since the air loads are carried mostly by the wing 130, the actuator assembly 320 may be configured primarily to overcome friction forces associated with sliding the DTE device 240. As a result, size of the actuator assembly 320 may be reduced to the point where it can be located entirely within the wing box 330. Advantageously, a fairing is not used to cover the actuator assembly 320, whereby collateral impact associated with the fairing is avoided.

Figure 4:
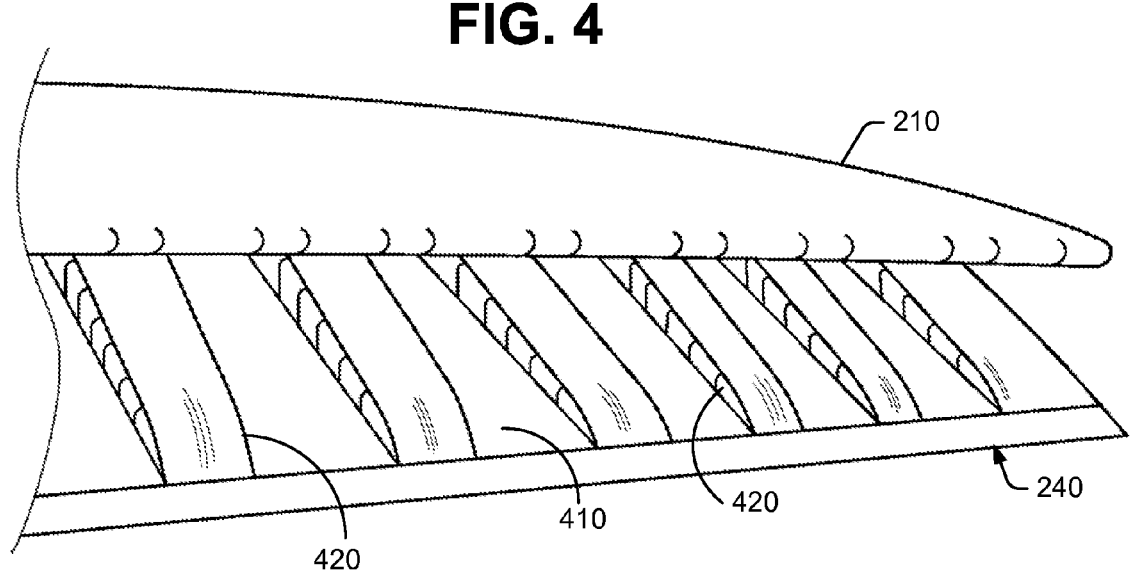
FIG. 4 is an illustration of a wing and a divergent trailing edge device at a trailing edge of the wing.

Reference is now made to FIG. 4, which illustrates an example of a trailing edge 210 and a DTE device 240 that is deployed. An upper surface 410 of the DTE device 240 is visible. The upper surface 410 has a plurality of ribs 420, which extend in a chordwise direction. The ribs 420 provide chordwise stiffness of the DTE device 240. The ribs 420 of the DTE device 240 make contact with the aft lower surface of the trailing edge 210. Upward flight loads on the DTE device 240 are transmitted by the ribs 420 to the trailing edge 210 and are reacted by the wing 130.

Figure 5:
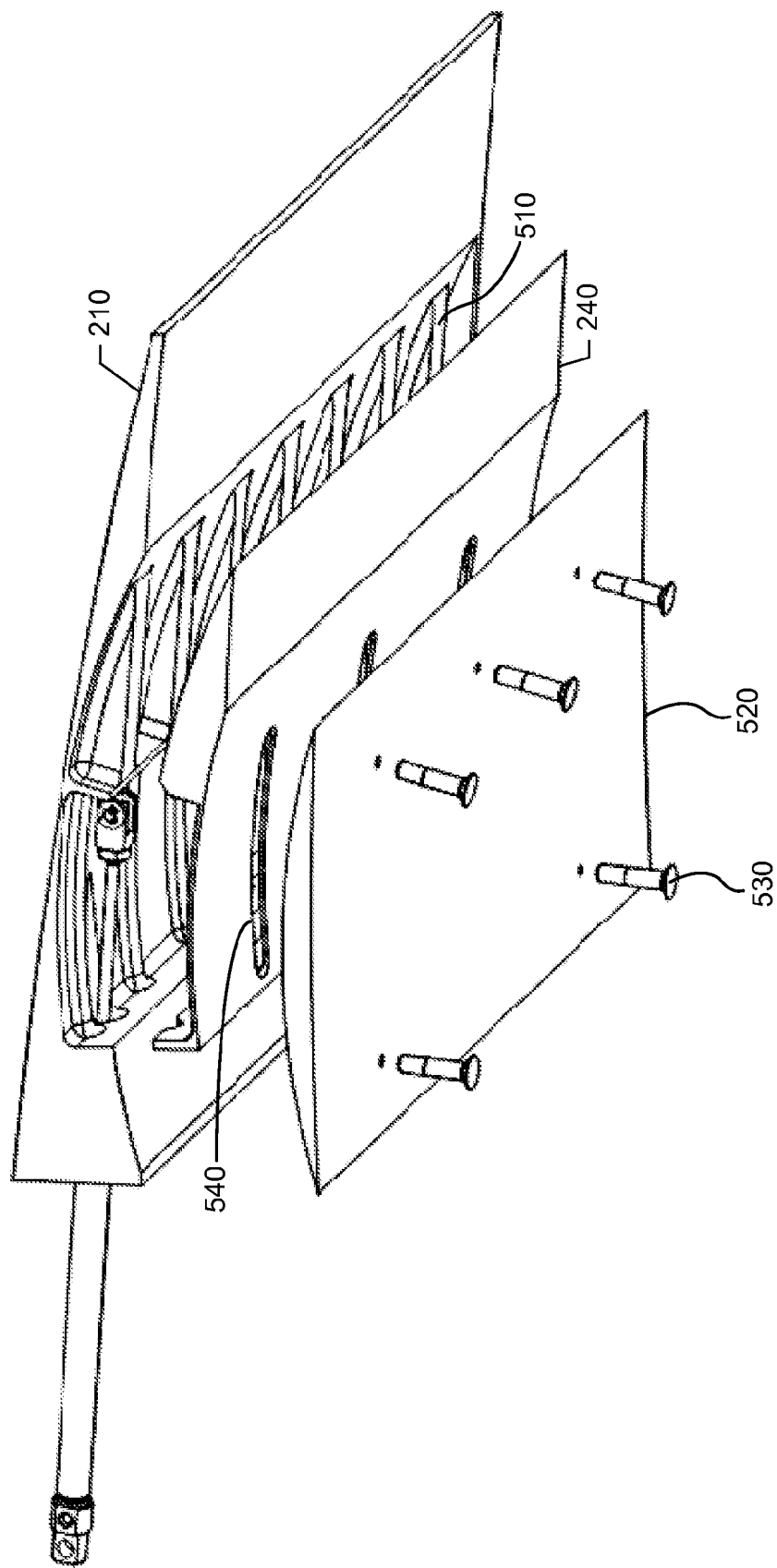
FIG. 5 is an illustration of a wing, a divergent trailing edge device, and a cover for a lower surface of the divergent trailing edge device.

Additional reference is now made to FIG. 5, which illustrates ribs 510 on an aft lower surface of the trailing edge 210. These ribs 510 extend in a chordwise direction. In some configurations, the ribs 510 on the after lower surface of the trailing edge device 210 may be interlocked with ribs on the upper surface of the DTE device 240.

Figure 3C:
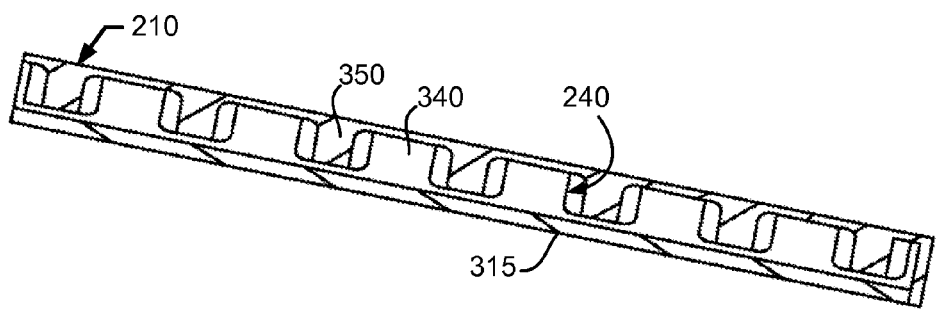
FIG. 3C is an illustration taken along sectional lines 3C-3C in FIG. 3B.

FIG. 3C shows a configuration in which ribs 340 on the upper surface of the DTE device 240 are interlocked with ribs 350 on an aft lower surface of the trailing edge 210. These interlocked ribs 340 and 350 provide chordwise stiffness and prevent jamming when loads are not uniform spanwise. With these loads paths, the risk of flutter is reduced.

Returning to FIG. 5, a cover 520 over a lower surface of the DTE device 240 provides a curved sliding surface for the DTE device 240. The cover 520 may also react air loads. For instance, the cover 520 may react a down load on the DTE device 240. The cover 520 may be fastened to the trailing edge 210 by fasteners 530. The fasteners 530 extend through slots 540 in the DTE device 240 and may limit lateral movement of the DTE device 240.

Figure 6:
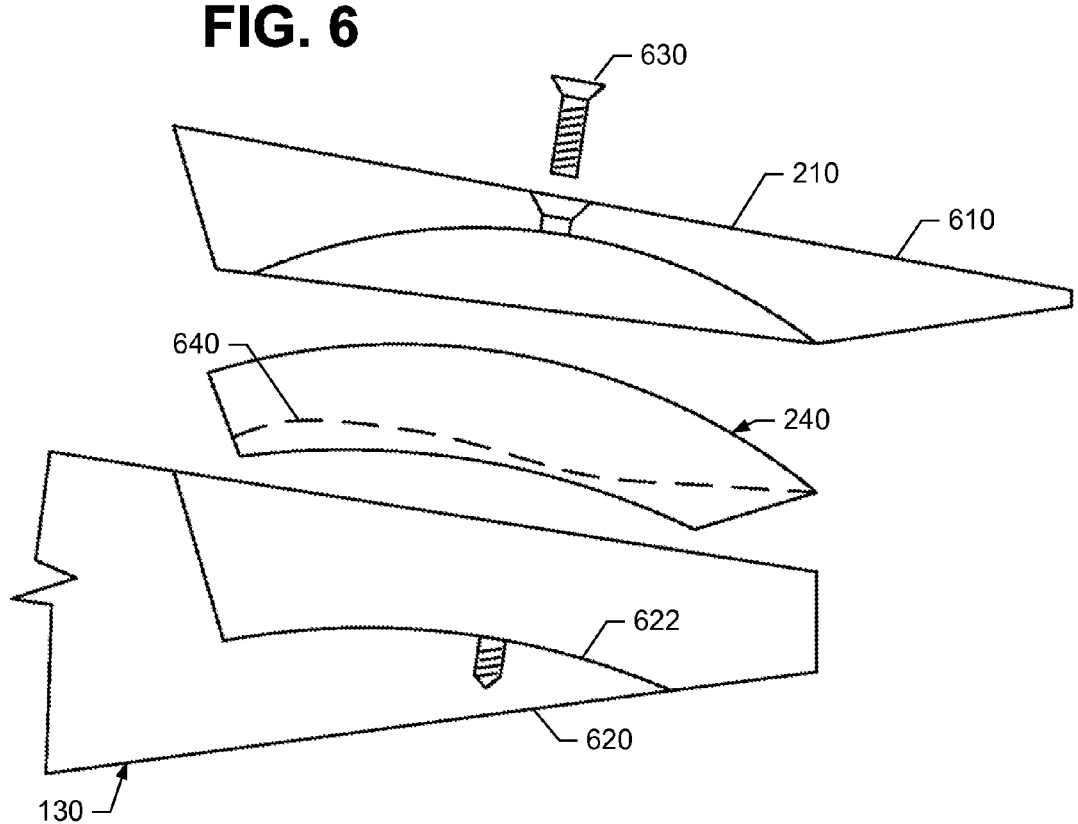
FIG. 6 is an illustration of a wing, a divergent trailing edge device, and a cover for an upper surface of the divergent trailing edge device.

Reference is now made to FIG. 6. In some configurations, a cover 610 may be part of the trailing edge 210. In the configuration shown in FIG. 6, the DTE device 240 slides along a surface 622 of a lower portion 620 the trailing edge 210. Fasteners 630 fasten the cover 610 to the lower portion 620. The fasteners 630 extend through slots 640 in the DTE device 240 and may limit lateral movement of the DTE device 240.

Although the DTE devices 240 in FIGS. 3A, 3B, 4, 5 and 6 are all shown with curved stiffened panels, the DTE device 240 is not so limited. For instance, the DTE device 240 may include a stiffened panel that is substantially straight Reference is made to FIG. 7, which illustrates a DTE device 240 that includes a substantially straight stiffened panel 710. An actuator assembly 320 including an actuator 720 and an actuator linkage 730 move the DTE device 240 between a stowed position and a fully deployed position. When deployed, the DTE device 240 has a fixed divergence angle (α). When stowed, the DTE device 240 is contained entirely within the trailing edge 210.

The actuator linkage 730 is along the direction of travel of the DTE device 240, which is mostly normal to the air load direction. Sized to overcome friction forces associated with sliding the DTE device 240, the actuator 720 and the actuator linkage 730 may be located entirely within the trailing edge 210.

Figure 8:
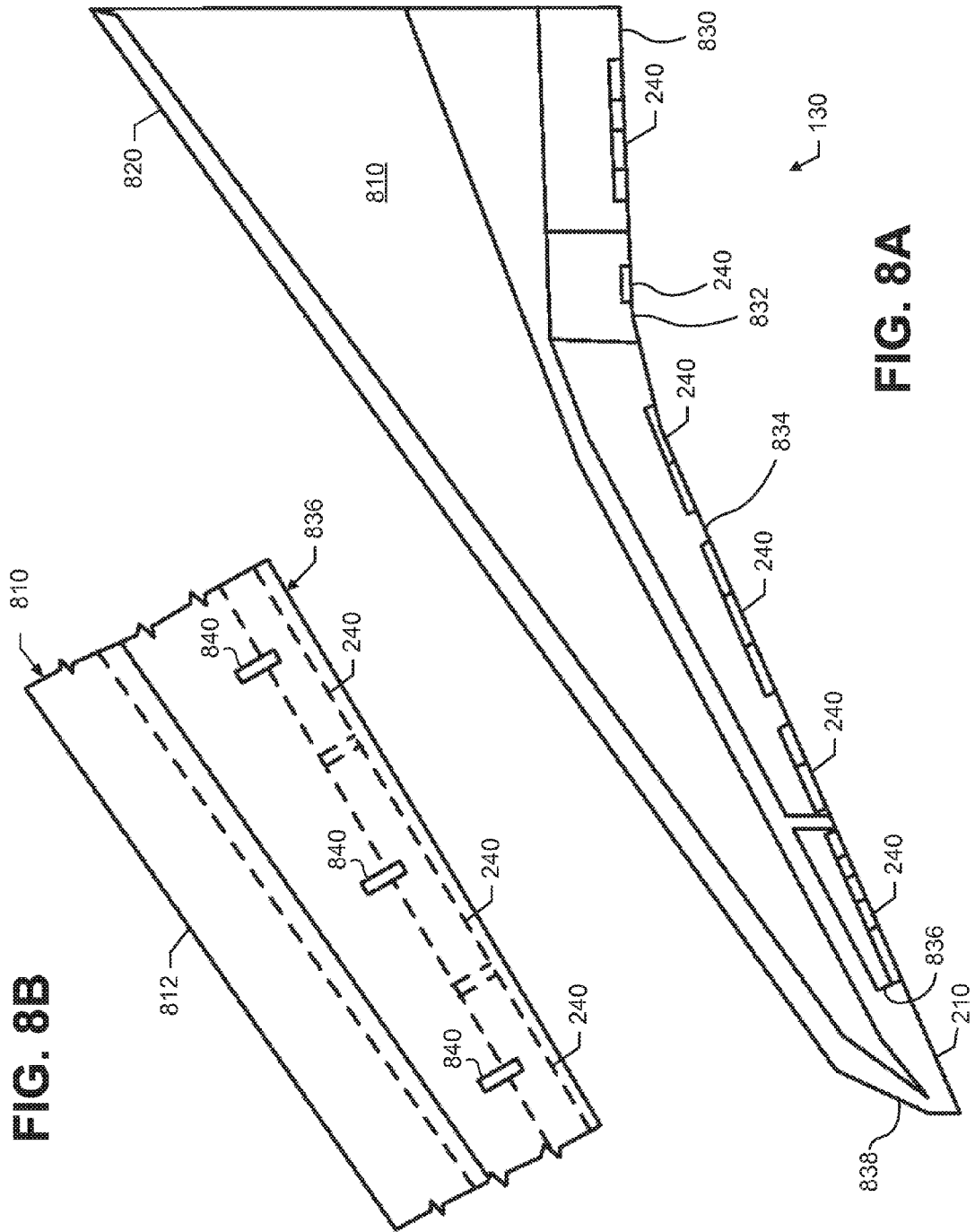
FIGS. 8A and 8B are illustrations of a wing including a plurality of divergent trailing edge devices.

Reference is now made to FIG. 8A, which illustrates an example of a wing 130 including a wing box 810, a leading edge 820, and a trailing edge 210. The trailing edge 210 includes moveable flight control surfaces such as an inboard flap 830, flaperon 832, outboard flap 834, and aileron 836. The trailing edge 210 further includes a fixed surface including a tip 838.

The wing 130 further includes a plurality of DTE devices 240. The surfaces 830 to 838 of the trailing edge 210 may include zero, one or multiple DTE devices 240. In the configuration shows in FIG. 8A, the tip 838 has no DTE devices 240, the flaperon 832 has a single DTE device 240, the inboard flap 830 has multiple DTE devices 240, the outboard flap 834 has multiple DTE devices 240, and the aileron 836 has multiple DTE devices 240. In another configuration, DTE devices 240 may be included from the root of the trailing edge 210 all the way out to the tip 838.

Each DTE device 240 is slideable between a stowed position and a fully deployed position. The DTE devices 240 may be stowed entirely within their respective surfaces of the trailing edge 210. The DTE devices 240 may be deployed fully or partially under their respective surfaces of the trailing edge 210.

Each of the DTE devices 240 may be provided with an actuator for independent control. Each actuator may be housed within its respective trailing edge surface 830-838.

For example, FIG. 8B illustrates a portion of the aileron 836 and a rear spar 812 of the wing box 810. Each of the DTE devices 240 may be independently controllable. For instance, each trailing edge device 240 may be provided with an actuator 840 that is housed with the aileron 836.

Reference is now made to FIG. 9, which illustrates a method of enhancing performance of an aircraft. The method includes selectively sliding one or more divergent tailing edge devices along a trailing edge of each aircraft wing to reduce lift over drag (L/D) of each wing (block 910). For example the DTE devices may be deployed to reduce drag and/or alleviate load. Any divergent trailing edge devices that are not deployed are stowed entirely within the trailing edges (block 920).

Deploying selected DTE devices during different phases of the flight is advantageous. Depending on wing loading due to gross weight, center of gravity, speed and altitude, the DTE devices may be scheduled to deploy to optimize wing loading and aerodynamic efficiency.

The invention claimed is:

1. An apparatus comprising:
    a wing, the wing including:
        an upper surface;
        a lower surface opposite the upper surface;
        a trailing edge;
        a compartment defined between the upper surface and the lower surface near the trailing edge; and
        an opening for the compartment defined in the lower surface, the opening spaced apart from the trailing edge such that a portion of the lower surface is disposed between the opening and the trailing edge; and
    a divergent trailing edge (DTE) panel slidably disposed within the compartment, the DTE panel slideable between (1) a stowed position in which the DTE panel is disposed within the compartment and (2) a deployed position in which the DTE panel extends through the opening and below the portion of the lower surface between the opening and the trailing edge, the DTE panel increasing lift over drag of the wing when in the deployed position.

2. The apparatus of claim 1, wherein a chord length of the DTE panel is between about 1% and 6% of a chord length of the wing.

3. The apparatus of claim 1, wherein the wing includes a moveable flight control surface defining at least a portion of the trailing edge, the compartment defined within the moveable flight control surface.

4. The apparatus of claim 1, wherein the compartment is defined within a fixed surface section of the wing.

5. The apparatus of claim 1, wherein a divergence angle between the DTE panel and the lower surface varies as the DTE panel is deployed.

6. The apparatus of claim 1, further including an actuator disposed in the wing to move the DTE panel between the stowed position and the deployed position.

7. The apparatus of claim 1, wherein the DTE panel is curved.

8. The apparatus of claim 1, wherein the DTE panel is straight.

9. The apparatus of claim 1, wherein an upper surface of the DTE panel includes ribs to engage a bottom of the upper surface.

10. The apparatus of claim 9, wherein the bottom of the upper surface includes ribs to interlock with the ribs of the DTE panel.

11. The apparatus of claim 1, further comprising a cover removably coupled to the wing, the cover defining a portion of the lower surface fore of the opening, the cover-providing a sliding surface for the DTE panel.

12. The apparatus of claim 1, further comprising a cover removably coupled to the wing, the cover defining a portion of the upper surface of the wing, the cover providing a sliding surface for the DTE panel.

13. The apparatus of claim 1, wherein the compartment is a first compartment, the DTE panel is a first DTE panel, and the opening is a first opening, the wing further including a second compartment and a second opening for the second compartment defined in the lower surface, further including a second DTE panel slidably disposed within the second compartment and slideable between a stowed position and a deployed position.

14. The apparatus of claim 13, further comprising a first actuator to control the first DTE panel and a second actuator to control the second DTE panel, the first and second actuators independently controllable.

15. An aircraft comprising:
    a wing including a moveable flight control surface having a trailing edge, a compartment defined between an upper surface and a lower surface of the moveable flight control surface, an opening for the compartment defined in the lower surface and spaced apart from the trailing edge such that a portion of the lower surface is disposed between the opening and the trailing edge;
    a divergent trailing edge (DTE) panel disposed within the compartment, the DTE panel slideable between (1) a stowed position in which the DTE panel is disposed within the compartment and (2) a deployed position in which the DTE panel extends from the compartment and is disposed below the moveable flight control surface; and
    an actuator to control the DTE panel independently of the moveable flight control surface.

16. The aircraft of claim 15, wherein the compartment is a first compartment and the DTE panel is a first DTE panel, further including a second DTE panel disposed within a second compartment in the moveable flight control surface, the second DTE panel slideable between (1) a stowed position in which the second DTE panel is disposed within the second compartment and (2) a deployed position in which the second DTE panel extends from the second compartment and is disposed below the moveable flight control surface.

17. A method comprising:
    sliding a divergent trailing edge (DTE) panel through a compartment defined in an aircraft wing and through an opening in a lower surface of the wing to reduce lift over drag (L/D) of the wing, the compartment defined between an upper surface and the lower surface of the wing, the opening defined in the lower surface and spaced apart from a trailing edge of the wing such that a portion of the lower surface is disposed between the opening and the trailing edge.

18. The method of claim 17, wherein the DTE panel is a first DTE panel, the compartment is a first compartment, and the opening in a first opening, further comprising selectively sliding a second DTE panel through a second compartment defined in the wing and through a second opening in the lower surface of the wing to vary L/D of the wing.

19. The method of claim 17, wherein the compartment is defined within a moveable flight control surface of the wing.

20. The apparatus of claim 1, wherein the DTE panel includes an aft edge and a fore edge opposite the aft edge, and wherein, in the stowed position, the aft edge of the DTE panel is disposed in the opening and aligned with the lower surface.

21. The apparatus of claim 20, wherein, in the deployed position, the aft edge of the DTE panel is spaced vertically below the trailing edge of the wing.

22. The apparatus of claim 1, wherein the compartment has a curved profile.

23. The apparatus of claim 11, wherein the DTE panel includes a plurality of slots, and wherein the cover is removably coupled to the wing via a plurality of fasteners extending through the slots.

* * * * *

UNITED STATES PATENT AND TRADEMARK OFFICE
CERTIFICATE OF CORRECTION

PATENT NO.       : 9,463,869 B2                              Page 1 of 1
APPLICATION NO.  : 14/298105
DATED            : October 11, 2016
INVENTOR(S)      : Jamison It is certified that error appears in the above-identified patent and that said Letters Patent is hereby corrected as shown below:

In the Claims

Column 5, Line 57 Claim 11:   Replace "cover-providing" with --cover providing--

Signed and Sealed this
Twenty-first Day of February, 2017

Michelle K. Lee
*Director of the United States Patent and Trademark Office*